United States Patent [19]
Grois et al.

[11] Patent Number: 5,613,025
[45] Date of Patent: Mar. 18, 1997

[54] ADAPTER ASSEMBLY FOR FIBER OPTIC CONNECTORS

[76] Inventors: Igor Grois, 4010 Greenacre Dr., Northbrook, Ill. 60062; Yuriy Belenkiy, 8655 Shermer Rd., Niles, Ill. 60714

[21] Appl. No.: 502,250

[22] Filed: Jul. 13, 1995

[51] Int. Cl.[6] ........................................... G02B 6/36
[52] U.S. Cl. ........................ 385/53; 385/59; 385/60
[58] Field of Search ........................... 385/59, 53, 60, 385/71, 72

[56] References Cited

U.S. PATENT DOCUMENTS

| | | | |
|---|---|---|---|
| 5,076,656 | 12/1991 | Briggs et al. | 385/60 |
| 5,123,071 | 6/1992 | Mulholland et al. | 385/53 |
| 5,268,982 | 12/1993 | Schaffer et al. | 385/86 |
| 5,293,581 | 3/1994 | DiMarco | 385/76 |
| 5,315,679 | 5/1994 | Baldwin et al. | 385/76 |
| 5,343,547 | 8/1994 | Palecek et al. | 375/76 |
| 5,398,295 | 3/1995 | Chang et al. | 385/58 |

FOREIGN PATENT DOCUMENTS

| | | | |
|---|---|---|---|
| 0567809A2 | 4/1993 | European Pat. Off. | G02B 6/38 |
| 6-3560 | 1/1994 | Japan | 385/53 |
| 4302826C1 | 4/1993 | Netherlands | G02B 6/36 |

*Primary Examiner*—John Ngo

[57] ABSTRACT

An adapter assembly is provided for holding two individual fiber optic connectors in generally parallel side-by-side alignment. The assembly includes a one piece body having a pair of through passages adapted for holding the fiber optic connectors in a substantially side-by-side relationship when the connectors are inserted axially into the passages. The body substantially entirely surrounds the connectors. Complementary interengaging latches are provided between the body and each fiber optic connector for latching the connectors in the passages automatically in response to the insertion the connectors thereinto. The latches are configured to afford lost motion between the body and each fiber optic connector to provide floating motion between the connectors and the body.

11 Claims, 2 Drawing Sheets

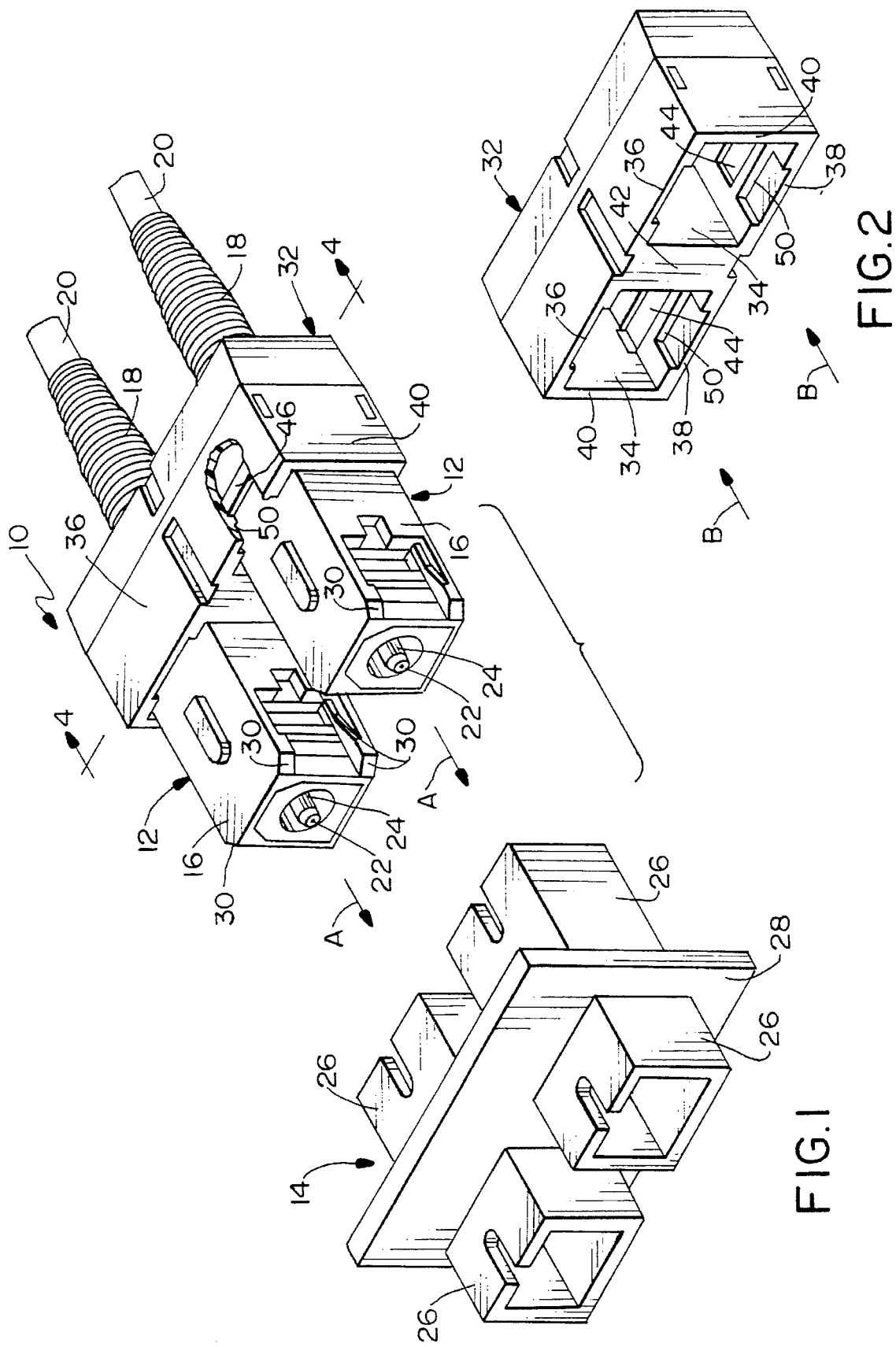

ADAPTER ASSEMBLY FOR FIBER OPTIC CONNECTORS

FIELD OF THE INVENTION

This invention generally relates to the art of fiber optic connectors and, particularly, to an adapter assembly for holding a pair of individual fiber optic connectors.

BACKGROUND OF THE INVENTION

Fiber optic devices use single or multiple strands of fibers each having an inner circular glass core coated with a circumferential cladding having a different index of refraction. Light is transmitted along the core and totally reflected from the interface between the core and cladding. Such devices can be used as transmission lines for transmitting information bearing light energy. A transmission line can be formed from a single fiber or it can include a plurality of fibers bundled together. Additionally, several transmission lines can be arranged in parallel for the simultaneous transmission of information along each of the separate lines.

Originally, fiber optic systems utilized simplex interconnection systems with single connector plugs terminating single fiber optic cables. In a simplex system, either transmission or reception of information can take place at one time. Consequently, simplex systems are limited in the amount of information that they can transmit and receive during a given period of time.

To increase the amount of information that can be communicated over fiber optic systems, multi-channel systems were developed. Such multi-channel systems include, for example, duplex connector plugs and cables which are capable of simultaneous transmission and reception. Thus, using a duplex system enables information to be transmitted at a much higher rate.

Despite the advantages, multi-channel fiber optic systems are relatively new, and many simplex systems and parts are already in use, for example, ST and SC type connectors. Consequently, simplex parts are readily available and less expensive because there is an existent inventory. Moreover, it would be difficult if not cost prohibitive to retrofit existing simplex systems with dedicated duplex or other multi-channel parts. Consequently, a need exists for an interconnection system which is compatible with both simplex and duplex parts and which permits the interconnection of simplex parts in a duplex configuration to provide duplex data transmission. Several designs have been proposed to address this problem. Typically, they involve an adapter structure which clamps on two individual connector housings to hold the two connectors in a side-by-side relationship forming a duplex connector.

The present invention is directed to providing an improved, more reliable adapter structure or assembly for holding a pair of connectors in a side-by-side relationship and ensuring that the connectors are maintained in a generally parallel relationship.

SUMMARY OF THE INVENTION

An object, therefore, of the invention is to provide a new and improved adapter assembly for holding two individual fiber optic connectors in generally parallel side-by-side alignment.

In the exemplary embodiment of the invention, the adapter assembly includes a body having a pair of through passages adapted for holding the fiber optic connectors in a substantially side-by-side relationship when the connectors are inserted axially into the passages. The body substantially entirely surrounds the connectors. Complementary interengaging snap-latch means are provided between the body and each fiber optic connector for latching the connectors in the passages automatically in response to inserting the connectors thereinto. Lost motion means are provided between the body and each fiber optic connector to provide floating motion between the connectors and the body at least transversely of the passages.

More particularly, the snap-latch means is provided by a recess in the body within each passage for receiving a latch projection on each fiber optic connector. The recess is enlarged relative to the latch projection to provide the lost motion means. In other words, the lost motion means comprises at least part of the snap-latch means.

Other features of the invention include a cam ramp surface on the body for engagement by the latch projection immediately prior to the latch projection becoming engaged in the latch recess. The connectors are generally rectangular in cross-section, and the passages are generally box-shaped. One of the latch recesses and latch projection combinations are provided in the body on opposite sides of each passage, such as within the top and bottom of each passage.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of an adapter assembly according to the invention and holding two individual fiber optic connectors, in conjunction with a duplex receptacle for the connectors;

FIG. 2 is a perspective view of the body of the adapter assembly;

DETAILED DESCRIPTION OF THE PREFERRED EMBODIMENT

Figure 3:
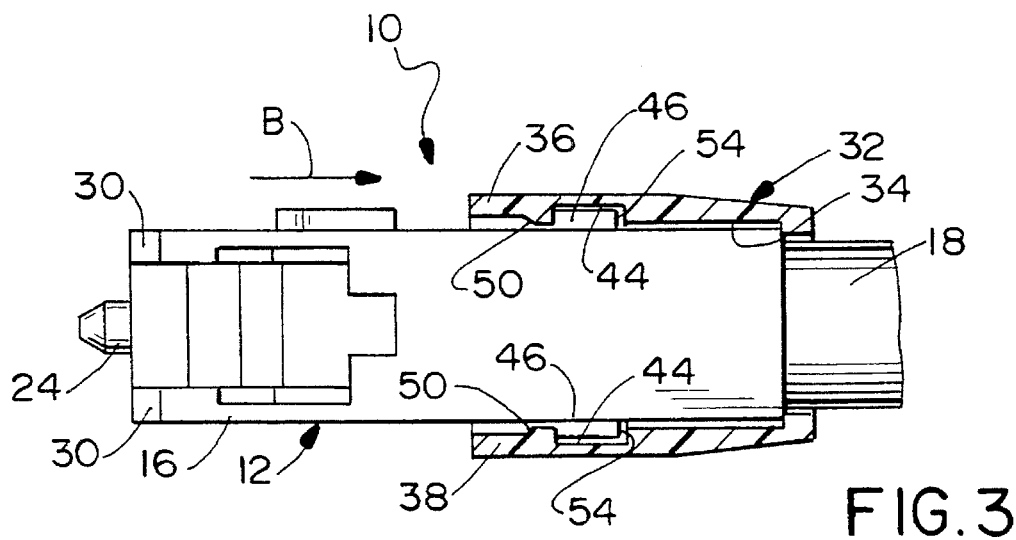
FIG. 3 is an axial section through one of the through passages in the body, with one of the connectors shown in elevation mounted within the passage.

Referring to the drawings in greater detail, and first to FIG. 1, the invention is incorporated in an adapter assembly, generally designated 10, for holding two individual fiber optic connectors, generally designated 12, in generally parallel side-by-side alignment so that the connectors can be easily inserted into a duplex receptacle, generally designated 14, or other duplex connecting device. Each fiber optic connector 12 includes a generally rectangular housing 16 with a boot 18 projecting from the rear thereof for embracing a fiber optic cable 20. As stated in the "Background", above, each fiber optic cable includes an inner circular glass core 22 surrounded by a circumferential cladding. The cores are shown in FIG. 1 centered within ferrules 24 of the fiber optic connectors.

As stated above, adapter assembly 10 is designed for holding connectors 12 in generally parallel side-by-side alignment for easy insertion of the connectors into duplex receptacle 14. The receptacle has a pair of rectangular sockets 26 on opposite sides of a flange 28. Connectors 12 are inserted into the sockets on the right-hand side of flange 28 in the direction of arrows "A". The front edges or corners of the housings 16 are chamfered, as at 30, to facilitate guiding the connectors into the sockets of duplex receptacle 14. A second pair of connectors or other complementary connecting devices are inserted into sockets 26 on the left-hand side of flange 28 of duplex receptacle 14 for mating with connectors 12. When mated, light is transmitted along cores 22 to and from the connectors and the mating connecting devices.

Referring to FIG. 2 in conjunction with FIG. 1, adapter assembly 10 includes a body, generally designated 32, which has a pair of rectangular or box-shaped passages 34. Body 32 is a unitary structure which can be integrally molded of plastic material. Passages 34 are adapted for holding fiber optic connectors 12 in a substantially side-by-side relationship when the connectors are inserted axially into passages 34 in the direction of arrows "B" (FIG. 2). When the connectors are inserted as shown in FIG. 1, body 32 substantially entirely surrounds the connectors within passages 34. In particular, each passage includes a top wall 36, a bottom wall 38 and an outside wall 40. Both passages share a common inside wall 42 which defines a partition between the passages.

Figure 4:
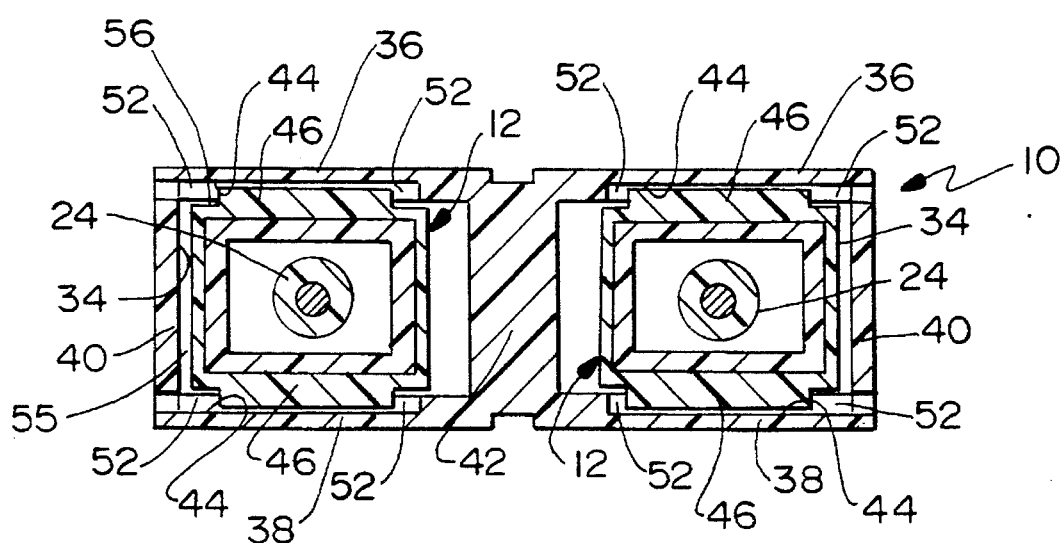
FIG. 4 is a vertical section taken generally along line 4—4 of FIG. 1.

Generally, complementary interengaging snap-latch means are provided between body 32 and each fiber optic connector 12 for latching the connectors in passages 34 automatically in response to inserting the connectors into the passages. More particularly, referring to FIGS. 3 and 4 in conjunction with FIGS. 1 and 2, the snap-latch means is provided by a latch recess 44 in the body in each of the top and bottom walls 36 and 38, respectively, of each passage 34. A latch projection 46 is formed on the top and bottom of the housing 16 of each connector 12. FIGS. 3 and 4 show latch projections 46 at the top and bottom of each connector 12 located within latch recesses 44 in body 32 at the top and bottom of each passage 34.

Referring specifically to FIG. 3, a cam ramp surface 50 is formed in body 32 within each passage 34 at the top and bottom thereof immediately in front of each latch recess 44. Upon insertion of one of the connectors 12 into its respective passage 34 as indicated by arrow "B" in FIG. 3, latch projections 46 will engage cam ramp surfaces 50 to bias top and bottom walls 36 and 38, respectively, outwardly. Since the body is molded of plastic material, the top and bottom walls will yield slightly and allow latch projections 46 to "snap" into latching engagement within latch recesses 44 of the body.

Generally, lost motion means are provided between body 32 and each fiber optic connector 12 to provide floating motion between the connectors and the body. More particularly, referring to FIG. 4, it can be seen that the transverse dimensions of latch projections 46 are less than the transverse dimensions of latch recesses 44. This defines open spaces 52 at one or both ends of the latch recesses depending on the positions of the connectors and the corresponding positions of the latch projections. In other words, the spacing affords relative movement or lost motion means of the latch projections within the latch recesses at least in the transverse direction of passages 34. Therefore, when fiber optic connectors 12 are held in their side-by-side alignment by body 32, and this entire assembly is mated with duplex receptacle 14 (FIG. 1) the fiber optic connectors can move relative to the body, as an operator grasps the body, to allow for insertion of the connectors into sockets 26 of the duplex receptacle. This lateral floating movement of the connectors relative to the body is enhanced by the chamfered corners 30 (FIG. 1) of connector housing 16.

Referring back to FIG. 3, it can be seen that the front-to-rear dimensions of latch bosses 46 are less than the front-to-rear dimensions of latch recesses 44 to afford some spacing or "play" therebetween, as at 54. Therefore, spacing 54 allows for relative movement or lost motion means between each fiber optic connector 12 and body 32 in a front-to-rear direction. More importantly, spacing 54 combines with transverse spacing 52, spacing 55 and spacing 56 (FIG. 4) to provide an overall floating motion between the connectors and the body, as may be considered in both an "X" and "Y" direction. This allows the connectors to self-align upon insertion of the duplex assembly into sockets 26 of duplex receptacle 14.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An adapter assembly for holding two individual fiber optic connectors, each connector including a housing and a ferrule mounted within the housing for terminating an optical fiber, in generally parallel side-by-side alignment, comprising:

a one piece body having a pair of through passages adapted for holding said fiber optic connectors in a substantially side-by-side relationship when the connectors are inserted axially into the passages, the body substantially entirely surrounding the connectors;

complementary interengaging snap-latch means between the body and the housing of each fiber optic connector for latching the connectors in the passages automatically in response to inserting the connectors thereinto; and lost motion means between the body and the housing of each fiber optic connector to provide floating motion between the connectors and the body allowing said connectors held by the adapter assembly to be inserted into a duplex receptacle simultaneously.

2. The adapter assembly of claim 1 wherein said lost motion means comprises at least part of said snap-latch means.

3. The adapter assembly of claim 1 wherein said snap-latch means comprise a latch recess in the body within each passage for receiving a latch projection on the housing of each fiber optic connector.

4. The adapter assembly of claim 3 wherein said latch recess is enlarged relative to the latch projection to provide said lost motion means.

5. The adapter assembly of claim 3, including a cam ramp surface on the body for engagement by the latch projection immediately prior to the latch projection becoming engaged in the latch recess.

6. The adapter assembly of claim 1 wherein said lost motion means comprises enlarged latch recesses in the body within the passages receiving the latch projections on the housing of each of the connectors.

7. The adapter assembly of claim 1 wherein said connector housings are generally rectangular in cross-section, and said passages are generally box-shaped.

8. An adapter assembly for holding two individual fiber optic connectors, each connector including a housing and a ferrule mounted within the housing for terminating an optical fiber, in generally parallel side-by-side alignment, said connector housing being generally rectangular in cross-section, comprising:

- a body having a pair of generally box-shaped through passages adapted for holding said fiber optic connectors in a substantially side-by-side relationship when the connectors are inserted axially into the passages, the body substantially entirely surrounding the connectors;
- complementary interengaging snap-latch means between the body and each fiber optic connector for latching the connectors in the passages automatically in response to inserting the connectors thereinto, said snap-latch means including a latch recess in the body within each passage for receiving a latch projection on the housing of each fiber optic connector; and
- said latch recess being enlarged relative to the latch projection to provide a lost motion means affording floating motion between the housings of the connectors and the body.

9. The adapter assembly of claim 8, including a cam ramp surface on the body for engagement by the latch projection immediately prior to the latch projection becoming engaged in the latch recess.

10. The adapter assembly of claim 8, including one of said latch recesses in both the top and bottom of each passage, and a corresponding latch projection on the top and bottom of each fiber optic connector housing.

11. The adapter assembly of claim 8 wherein said latch recess is enlarged relative to the latch projection in both a direction transversely of the passages as well as longitudinally of the passages.

* * * * *